July 25, 1939.

E. VAN DER PYL

Re. 21,165

ABRASIVE WHEEL

Original Filed Aug. 12, 1935

Inventor

EDWARD VAN DER PYL

By George Crompton Jr.

Attorney

Reissued July 25, 1939

Re. 21,165

UNITED STATES PATENT OFFICE 21,165

ABRASIVE WHEEL

Edward Van der Pyl, Holden, Mass., assignor to Norton Company, Worcester, Mass., a corporation of Massachusetts Original No. 2,072,051, dated February 23, 1937, Serial No. 35,881, August 12, 1935. Application for reissue April 28, 1938, Serial No. 204,906

5 Claims. (Cl. 51—280)

The invention relates to abrasive wheels and a method of making the same.

One object of the invention is to provide a low melting point metallic bond for diamonds. Another object of the invention is to provide a grinding wheel for grinding very hard substances. Another object of the invention is to provide a grinding wheel comprising very hard grain and a bond suitable therefor. Another object of the invention is to provide a bond for diamond abrasive from which the diamonds may be recovered at small expense and without destruction of the diamonds. Another object of the invention is to provide a method of bonding carbonaceous grain which is effective and which may be carried out without burning the grain. Other objects will be in part obvious or in part pointed out hereinafter.

The invention accordingly consists in the features of construction, combinations of elements, and arrangements of parts, and in the several steps and relation and order of each of said steps to one or more of the others thereof, all as will be illustratively described herein, and the scope of the application of which will be indicated in the following claims.

Figure 1:
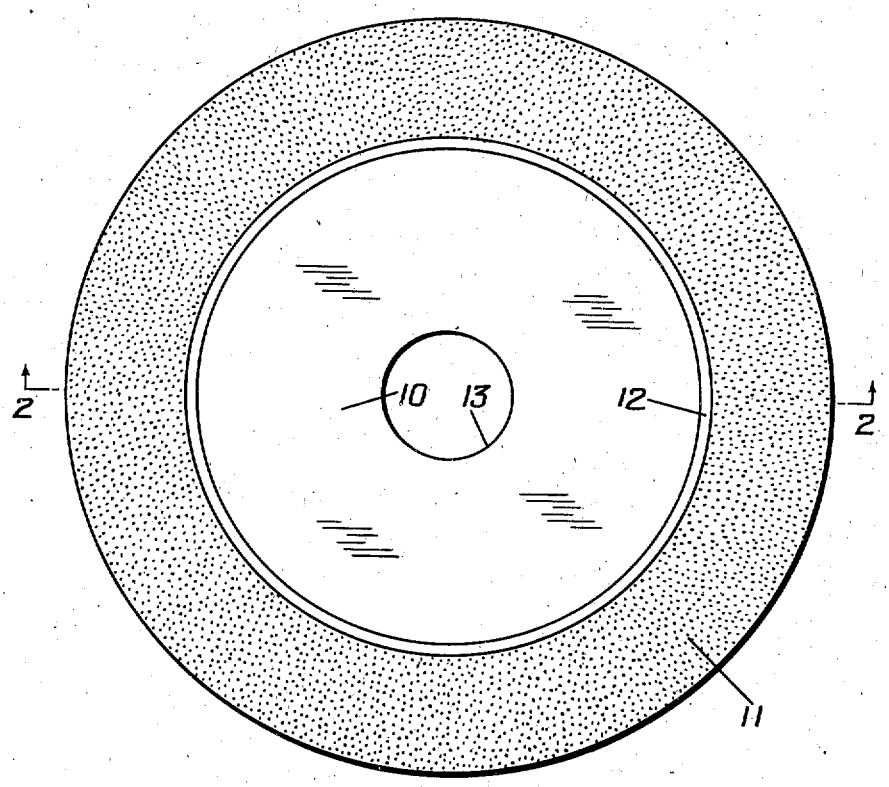
Figure 2:
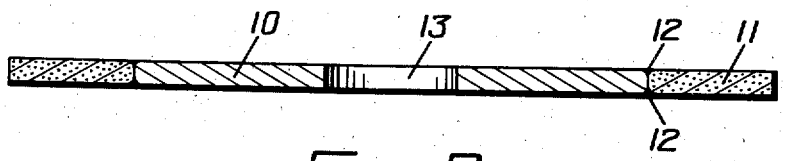

In the accompanying drawing, in which is shown one of various possible embodiments of the mechanical features of this invention, Fig. 1 is a plan view of a grinding wheel constructed in accordance with certain features of the invention, Fig. 2 is a cross sectional view on the line 2—2 of Fig. 1.

According to the preferred method of carrying out my invention, I provide diamond grit in finely divided or grain form. Diamond grit which, because of its extreme hardness and its other qualities, constitutes probably the best abrasive substance known, exists in a form commercially known as "bort" which is commercially available in sufficient quantities and at such prices that it may be used for the manufacture of grinding wheels and other abrasive bodies. While bort is expensive, nevertheless on account of the great superiority of the diamond for abradant purposes, the wheel formed thereof has many practical uses and advantages.

Also, in the preferred embodiment of my invention, I provide bond in the form of a powdered alloy. Although such powdered bond might be a mixture of two or more metallic powders, I prefer to proceed as follows.

Selecting two or more metals according to considerations hereinafter set forth I put them together in a melting pot in the proportions desired and melt them together. I then cast ingots of the alloy in sand molds. These ingots I then crush by means of crushing rollers or the like until the allow is in powdered form of the desired mesh size.

With the powdered metallic bond of the type indicated I mix in the neighborhood of between 25% and 50% by volume of diamond bort in a grit size of between 80 mesh and 500 mesh, for example. Mesh size of the bort selected will depend upon the abrading operation that the wheel is to perform, and my invention has no limitations in this respect, in so much as grinding, polishing and lapping operations differ vastly among themselves. For the finer polishing or lapping operations, finer grit size of bort will be used. The mesh size of the metallic bond may also vary between wide limits; I merely note that using 100 mesh diamond grit, powdered bond of 200 mesh is highly practical, but other mesh sizes of the bond may be used even with the given size of diamond grit.

The mixing of the grit with the bond may be accomplished manually, for although machine methods might be used, the bort or diamond dust is so valuable as to dictate care in the mixing to avoid loss of diamond. Setting apart a measured or desired quantity of mixed bond and bort, I place it in a mold. This mold may take any form, for although I am describing the invention in connection with the manufacture of a wheel, other abrasive bodies are to be deemed included. In case the abrasive body is a wheel, in most cases it will have a central hole for mounting upon an arbor or the like, and accordingly in such cases the shape of the mold is an annulus. For the material of the mold I prefer graphite, on account of its many desirable properties, such as that it may be easily destroyed to remove the formed wheel; it has an affinity for oxygen thus inhibiting oxidation of the materials of the wheel; it is reasonably inexpensive; it may be easily machined into desired form or shape; it will not melt and will not go to pieces under any temperatures which I contemplate using.

Having placed the desired quantity of mixed grain and bond in the mold selected, I apply heat and pressure. Within the limits of my invention the pressure range is wide, and the heat employed is such as to cause sintering of the bond at the pressure employed or under the conditions of intimate union achieved. For example, I may cold press the bond and abrasive grain, heating the substance thereafter. In such cases I might use a mold other than graphite in connection with plunger and pressure mechanism, heating the formed or "green" wheel on a "bat". The union of the metallic grain after it has been pressed is such that it may be formed into a practically integral mass which will tightly hold the abrasive bodies by heat treating at a temperature which does not completely melt to a liquid state but sinters. The separate pressing and heating of the bodies has the advantage that a simpler apparatus and a cheaper method may be employed. However, in certain cases the heat and pressure may be applied simultaneously.

Considering now the bond employed according to my invention, I preferably use an alloy of copper. With the copper I alloy another metal which produces an alloy harder and more brittle than copper. I desire the bond to hold the diamonds firmly, to be tough and enough so that the diamonds will not rip out, and nevertheless at a certain pressure and resistance to go to pieces rather than glaze. It is desirable that the bond should crumble off in little bits or fine fragments so as to expose new cutting edges of the diamond from time to time, and an alloy or metal which can be crushed to powdered form may have the desired characteristics. Such an alloy is brittle and may be characterized as friable. I give below examples of specific alloys which I may use.

*Example 1*

I form an alloy of 68% copper and 32% tin. This alloy is a bronze having quite brittle characteristics. The exact proportions indicated need not be employed so long as a fairly brittle alloy is achieved. This alloy of 68% copper and 32% tin is a eutectic and melts at 750° C. and enables me to sinter it at a temperature at which there is very little danger of oxidizing the diamonds.

*Example 2*

I make an alloy of copper and nickel, 35–50% of copper and 65–50% of nickel. This also has brittle characteristics and is tough. It melts at around 1200° C., but I may use the precautions hereinafter referred to to prevent oxidation of the diamond or the bond.

*Example 3*

I make an alloy comprising approximately 85% copper with 15% aluminum. This melts at around 1050° C. and has brittle characteristics but is fairly tough.

*Example 4*

I make an alloy of copper and manganese, 65% or more of copper and 35–20% of manganese. This melts at 900° C. and has the properties of toughness and brittleness desired.

*Example 5*

I use nearly pure copper but mix in with it a very small proportion, from a trace to 1% or 2%, of beryllium (glucinium). Copper melts at 1065° C. or thereabouts.

It is advantageous to take certain precautions against burning of the diamonds in the case of the alloys which sinter at the higher temperatures, for example above 900° C. The use of a graphite mold or container during the heating operation is such a precaution. However, even when a graphite mold is used, and more especially so when it is not, it will be well to heat the body in a non-oxidizing atmosphere, such as nitrogen or hydrogen. I have also found that a small amount of aluminum, silicon or magnesium may be introduced into the bond, preferably as separate distinct metallic particles, that is not in an alloy state, which will inhibit oxidation of diamond and bond because such metals have a great affinity for oxygen.

In many cases I desire to make the bond as brittle as possible for the specific alloy used and brittleness is enhanced by quenching the abrasive body when still hot from the heat treatment.

One marked advantage of a wheel constructed according to the invention lies in the fact that, when produced in annular form, it may be readily united to a central disk. Diamond grinding wheels are, under present market conditions, expensive, whatever the bond used, owing simply to the high price of bort, and accordingly it is highly desirable to waste as little of the diamond as is possible. In the case of any grinding wheel which is thin relative to its diameter, the central part will generally not be used for abrading. Accordingly, in the case of diamond wheels it is preferred to form the central part in the form of a non-grinding disk or annulus. While a small internal grinding wheel, having a length on the order of half its diameter, may comprise 100% grinding substance and be attached by mounting directly upon a spindle, in the case of a cutting-off wheel or a large sized wheel for the grinding of the cemented tungsten carbides and other hard substances, it is generally found economical to secure what amounts to an annular band of diamond grinding material to a central disk having hole therein. Therefore, a distinct problem has arisen in attaching the inside of the annular band of grinding substance to the periphery of the central supporting disk. If the union between the parts is weak, fracture will result and this destroys the grinding wheel which may have a market value in the neighborhood of from $50 to $200.

According to the present invention, with diamond bonded with metallic bond as disclosed in the foregoing description, I may provide a thin aluminum disk, or a disk of any other metal, and form my grinding substance in the shape of an annular band whose inner diameter is the same as the outside diameter of the disk. I may then unite the disk to the grinding band by brazing, soldering, preferably with silver solder, or by any other metallurgical operation for integrally uniting metals, such as welding or the like, and the result is an integral structure of central supporting metallic disk having an annular band of grinding substance on its periphery including diamond grain bonded in a metal bond. For cutting-off wheels and the like, the central supporting disk should be no thicker than the annular band of grinding material. Referring now to the drawing, I provide a central disk 10 which may be made of any suitable metal, such as aluminum. According to any of the methods hereinbefore disclosed I form an abrasive annulus 11 whose inside diameter is the same as the outside diameter of the disk 10. I then attach together the disk 10 and the annulus 11 by means of silver solder 12 or otherwise in accordance with the foregoing. Desirably the disk 10 has a central hole 13.

Although I have noted throughout diamond as the abrasive grit, certain advantages inhere in the combination of the bond specified with boron carbide grit. Boron carbide is an expensive abrasive grit, although not as expensive as diamond bort. Furthermore, boron carbide as well as diamond should not be exposed to high temperatures, or if it is only for a short time and with suitable precautions such as indicated, in order to avoid oxidation and other chemical changes. The bonds described herein are all of them reasonably low melting point bonds, and they fuse or sinter at a somewhat low temperature when under pressure or when the particles are in intimate contact as described, and accordingly these bonds are very suitable for the bonding of diamond and other carbonaceous substances such as boron carbide. The bonds of the invention are more in the nature of a matrix than the common vitrified bonds, and they are harder and tougher than the artificial resinous bonds, and have properties different from those of a rubber bond, and the properties of the bonds of this invention are highly desirable in combination with grain of extreme hardness such as diamond and boron carbide, on Moh's scale extension 15 and 14 respectively.

It will thus be seen that there has been provided by this invention a method and an article of manufacture or composition of matter in which the various objects hereinabove set forth together with many thoroughly practical advantages are successfully achieved. As various possible embodiments might be made of the mechanical features of the above invention and as they are herein described might be varied in various parts, all without departing from the scope of the invention, it is to be understood that all matter hereinbefore set forth is to be interpreted as illustrative and not in a limiting sense.

I claim:

1. An abrasive body comprising diamond grain and a copper nickel bond.

2. An abrasive body comprising diamond grain and a copper aluminum bond.

3. An abrasive body comprising diamond grain and a copper tin bond.

4. An abrasive body comprising diamond grain and a metallic bond consisting of copper and an additional metal adapted to impart friableness to the copper and comprising one of the group consisting of nickel, aluminum, manganese, tin and beryllium, the proportion of the additional metal being such as will impart the friableness.

5. A grinding wheel comprising a metal disk integrally united to an annular outside band comprising diamond grain bonded with metal, both the disk and the band including aluminum.

EDWARD VAN DER PYL.